2,949,340

METHOD FOR THE RECOVERY OF ALKALINE SOLUTIONS CONTAINING GERMANIUM

Oskar Rösner, Goslar, Germany, assignor to Clevite Corporation, Cleveland, Ohio, a corporation of Ohio No Drawing. Filed Sept. 6, 1955, Ser. No. 532,752

1 Claim. (Cl. 23—51)

This invention relates to the separation and recovery of germanium from solution, particularly from used alkaline etching solutions.

In the preparation and manufacture of germanium, such as for use in semiconductor diodes and transistors, alkaline solutions frequently are used to etch the surface of the germanium. The used etching solutions contain considerable proportions of germanium, which heretofore was recovered by neutralizing the solution with sulfuric acid, whereby the germanium precipitated extensively in form of germanium-oxide. The yield of germanium recovered by this technique, were comparatively unfavourable.

In accordance with the present invention the used etching solutions are treated to recover the germanium content in considerably higher yields in the following simple way:

An appropriate amount of ammonium chloride is admixed with the alkaline solution, whereupon the germanium is separated almost quantitatively in form of a very pure ammonium-germanate. The residual solution contains only traces of germanium.

Following is an example of the method and the results attained: One liter of used alkaline etching solution was admixed with 200 grams of $NH_4Cl$ and stirred well. The germanium precipitated out in the form of ammonium-germanate and was filtered off. The filtrate contained only 0.1 gram of germanium per liter.

What is claimed is:

A method of separating and recovering germanium, in the form of ammonium germanate, from alkaline germanium-bearing solutions, comprising the step of admixing ammonium chloride with such solutions to precipitate out substantially all of the germanium in the form of ammonium germanate.

References Cited in the file of this patent

Mellor, "A Comprehensive Treatise on Inorganic and Theoretical Chemistry," vol. 7, page 267, Longmans, Green and Co. (1927).

Novotny et al., "Monatshefte Fur Chemie," Band 85, 1954, pp. 560–561.

Hampel, Rare Metal Handbook, p. 164, 1954, Reinhold Publ. Co.